United States Patent Office 3,213,956
Patented Oct. 26, 1965

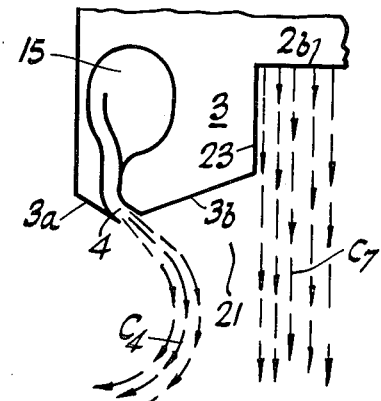
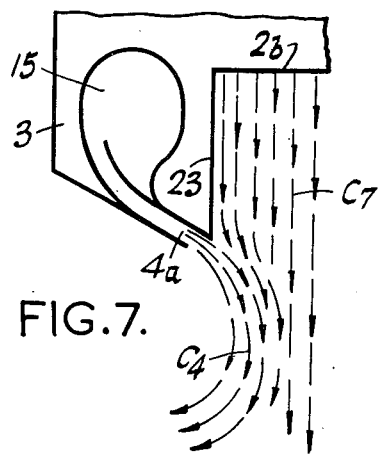
FIG.6. FIG.7.
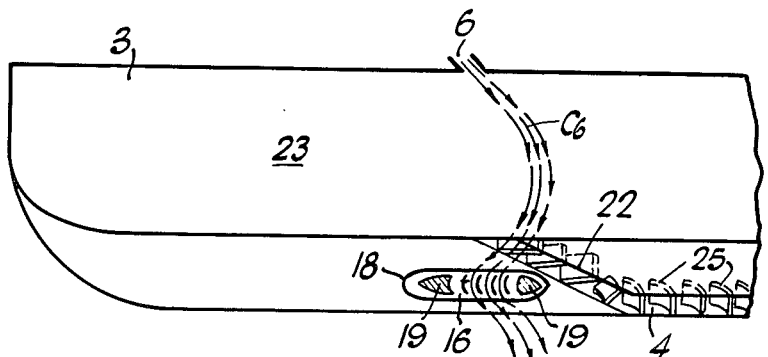
FIG.8.
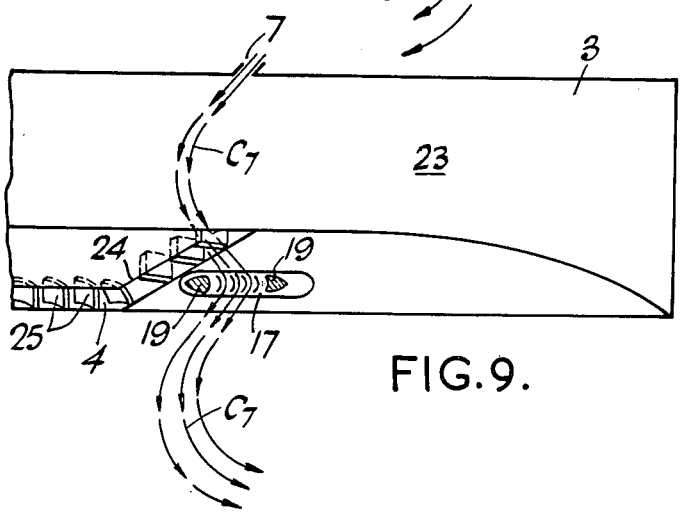
FIG.9.

3,213,956
VEHICLES FOR TRAVELLING OVER LAND AND/OR WATER AND EQUIPPED WITH DEPENDING SIDE WALLS
Christopher Sydney Cockerell, Victoria Grove, East Cowes, Isle of Wight, England, assignor to Hovercraft Development Limited, London, England, a British company
Filed June 12, 1959, Ser. No. 819,968
22 Claims. (Cl. 180—7)

This invention relates to vehicles primarily adapted for travelling over water, of the kind described in U.S. application Serial No. 627,925.

In such vehicles at least one jet of fluid is discharged from the bottom of the vehicle in the form of a curtain which, with the structure of the vehicle and the surface over which the vehicle travels or hovers, encloses a pressurised cushion of gas which supports the vehicle, the total thrust produced by the jet of fluid as it leaves the vehicle being substantially less than the total weight of the vehicle. Such vehicles will hereinafter be referred to as "vehicles of the type described."

The above-described method of support is also applicable to a platform primarily intended to remain stationary, for example for supporting a radar installation, and the term vehicle as used herein is to be understood as including, where the context permits, a platform.

For operation over rough water a vehicle of the type described should be so designed that its main body does not come into contact with any wave, the impact of which might cause damage to the vehicle or inconvenience to its passengers. One way of ensuring this is to design the vehicle so that it has a hover-height greater than that of the crest of the highest wave likely to be encountered. Since, however, the movement of the water is, in general, random, this would mean that for most of the time the hovercraft would be travelling at a greater height than necessary, with a consequent wastage of power. An object of the present invention is to reduce the power necessary to enable the vehicle to operate with its main body at a height above the water which will keep it clear of waves likely to cause damage.

According to the invention the vehicle is provided with two walls which project below the bottom of the vehicle and are located one on each side of the vehicle and are substantially parallel to its intended direction of motion, so that they form part of the boundary enclosing the said pressurised cushion, the remainder of the boundary being formed by curtains of fluid. The side walls have a width which is only a small fraction of the total width of the vehicle, so that comparatively little shock is experienced by the latter if the side walls are hit by a wave.

A vehicle according to the invention may be so designed and operated that the side walls are at all times partially immersed in the water, it being understood that owing to their small lateral dimensions, they contribute little to the drag experienced by the vehicle. In this case no provision is made for the formation of a fluid curtain under the side walls, the boundary for the pressurised cushion being constituted by the two side walls and by two fluid curtains one at the front part and one at the back part of the vehicle. The side walls may contribute to the lift by making them hollow, so that they act as buoyancy chambers.

It is, however, preferred to provide the side walls with ports which are fed with fluid for the formation of side curtains additional to the front and back curtains, the combined thrust of all the curtain-forming jets of fluid being such that, while the main body of the hovercraft is held above the level of the waves, the lower parts of the side walls are immersed in wave crests above a height which can be predetermined by predetermining the thrust of the side-wall jets. An advantageous arrangement is one in which the side walls cut through the crests of waves of average height. It will be understood that the flow of fluid through the side wall ports ceases when the ports are immersed. Again, the side walls, with or without the ducts leading to the ports, may be designed to act as buoyancy chambers.

It will be understood that in a vehicle according to the invention with side curtains as well as front and back curtains, the latter must have a greater height than the former. The difference in height may be brought about by various methods. For example, the fluid forming the front and back curtains may be given a greater thrust per unit length of curtain than that forming the side curtains. Alternatively the front and back curtains may, by suitable arrangements of ports and ducts as described, for example, in U.S. application Serial No. 809,699, which has since become abandoned, be given the form of a vortex or of multiple curtains formed by recirculation of the fluid, the side curtains being formed from simple jets of fluid. In this case the greater efficiency obtained by recirculation enables front and back curtains of greater height to be secured for a given thrust.

According to a feature of the invention it is, however, preferred to provide a deflector at the front and/or back of the vehicle which is located in the path of the fluid forming the curtain, and is so shaped in cross-section as to deflect the fluid with a component of motion inwards, thereby forming in effect a second curtain which is an extension of that formed by the fluid issuing from the vehicle. The deflector may advantageously be horizontal and located substantially at the same height as the lower part of the side walls.

Instead of a single deflector, it is preferred to use a bank of deflectors spaced from each other in a fore-and-aft direction. This increases the efficiency with which the curtain fluid is caught and deflected inwards. It will be understood that for the curtain to be deflected inwards efficiently, the spacing between the deflectors for a given angle of deflection of the fluid is a function of their width in a vertical direction.

More than one bank of horizontal deflectors may be provided, one below the other thus effectively further extending the height of the curtain for a given port width as compared with that which it would have if no deflectors were provided. Since the recovery of the curtain at the first bank is not 100% efficient, the next lower bank is located nearer to the first bank than the latter is to the bottom of the vehicle.

A secondary advantage of the use of side walls which are immersed in the water lies in the fact that they tend to give directional stability to the vehicle. If, for example, the vehicle is on a course parallel to the prevailing direction of wave motion, the wavelength being substantially less than the length of the vehicle, the side walls will at any instant be immersed at a number of points along their length in successive wave crests, and this will tend to hold the vehicle on course.

It has been mentioned above that the front and back curtains may have the form of vortices or multiple curtains formed by recirculation. If desired, the side curtains may be so formed with or without similar formation of the front and back curtains, though in either case it will be necessary to arrange for the side curtains to have less thrust than the front and back curtains, so as to obtain the necessary difference in height.

In order to enhance the stability of the vehicle, the front and back curtains or, more conveniently, the side curtains, or both, may be duplicated as described in U.S. application Serial No. 16,677.

In addition to the two side walls described above, a central wall may be provided which likewise projects from the bottom of the vehicle and runs substantially parallel to the aforesaid walls. This central wall may function analogously to a keel, but its more important function is to divide the cushion into compartments to stabilise the vehicle. Each side wall may be replaced by a pair of side walls for the same purpose.

The invention will be described by way of example with reference to the accompanying drawings in which:

FIG. 6 is a cross-section of one of the side walls on the line C—C of FIG. 4.

FIG. 7 is a cross-section of an alternate shape of side wall.

FIG. 8 is a side elevation of the inside face of the front portion of a side wall, showing the relative positions of the mouths and front deflectors.

FIG. 9 is a side elevation of the inside face of the rear portion of a side wall, showing the relative positions of the mouths and rear deflectors.

Figures 1, 2:
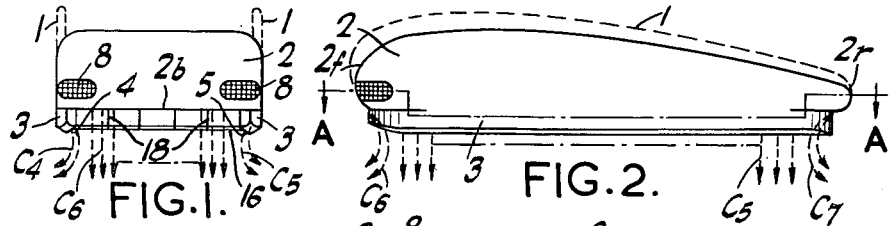
FIG. 1 is a front elevation of a vehicle according to the invention.
FIG. 2 is a side elevation of the vehicle illustrated in FIG. 1.
Figure 3:
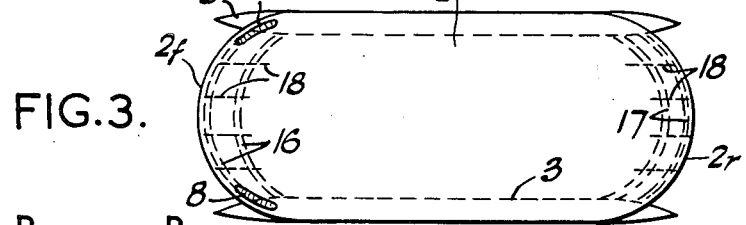
FIG. 3 is a plan view of the vehicle illustrated in FIG. 1.
Figure 4:
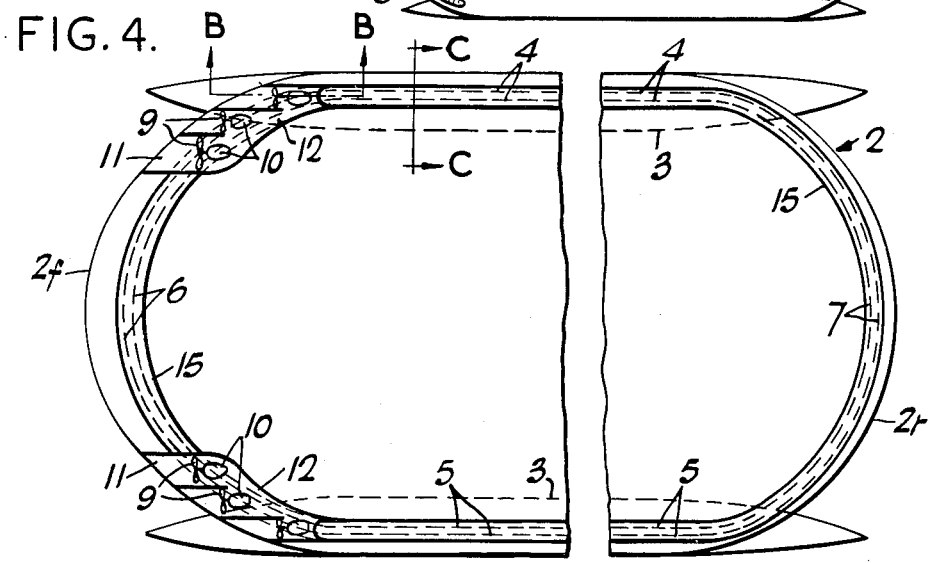
FIG. 4 is a sectional plan view of the front and rear portions of the vehicle approximately on the line A—A of FIG. 2.

The vehicle illustrated in FIGS. 1, 2 and 3 is of a form substantially rectangular, the ends being rounded in the plan view to give a better aerodynamic shape. The length of the vehicle is approximately twice the width, the height varying according to the purpose for which the vehicle is constructed. Preferably the side elevation, as in FIG. 2, is of a form giving good aerodynamic qualities. To further improve the aerodynamic quality, side fins extending upwards at each side of the body may be provided, as shown by dotted lines 1 in FIGS. 1 and 2. The vehicle is of inverted channel form in the end view, there being a main body 2 provided with side walls 3 depending from the main body and extending for the length of the vehicle. The side walls are provided at their lower parts with ports extending along their length, as shown by dotted lines 4 and 5 in FIG. 4, and further ports extend across the bottom 2b of the main body at the front end 2f and rear end 2r, shown at 6 and 7, respectively, in FIG. 4.

At the front of the vehicle are provided two air inlets 8, one on each side. Behind the inlets are situated several propellers 9, each, in the example illustrated, driven by a gas turbine engine 10, and being mounted in individual chambers 11. Air is compressed by the propellers, the air passing through the individual chambers into main air galleries 12. Combustion air for the gas turbines enters the turbine via inlet 13, FIG. 5, the exhaust gases passing into the main air galleries 12 with the air from the propellers. The turbines, and propellers, are mounted in the ducts on suitably shaped struts 14, through which can pass the fuel pipes and engine controls. The propellers 9 may be of fixed or variable pitch design, and may of course be driven by any other suitable means.

From the main air galleries 12 the air passes downwardly into a duct 15. The duct passes right around the vehicle, being contained within the side walls when passing along the sides of the vehicles. From the duct 15 the air is impelled through and caused to issue from the peripheral nozzles 4, 5, 6 and 7, as a result of the action of propellers 9, to form curtains $C_4$, $C_5$, $C_6$ and $C_7$ which are continuous around the periphery of the vehicle.

The cross-section of the side walls may vary, but in the example illustrated they are as shown in FIG. 6. The bottom of the side wall 3 is of V formation, defined by downwardly convergent edges 3a and 3b, the point of the V being offset to the outside of the vehicle, the port 4 being formed along the inner edge 3b of the V. In operation, air is expelled from the port 4 in an inwards and downwards direction to form the aforesaid curtain $C_4$. Similarly air is expelled from the port 5 in the other side wall, and from the ports 6 and 7 at the front and rear. A pressure is built up beneath the vehicle to the extent that it is necessary to raise the vehicle from the ground or from the water. As the pressure rises, the curtain is deflected outwardly from the space beneath the vehicle.

A bank of deflector blades 16 is arranged at the front of the vehicle between the side walls 3, the centre line of the bank being vertically below the port 6. A similar bank of deflector blades 17 is arranged at the rear of the vehicle, similarly placed below the port 7. Each bank of deflector blades is curved, in plan form, so that they are always in the correct position relative to the ports 6 and 7, and is supported along its length by struts 18 of streamlined form.

The position and action of the front bank of deflector blades 16 is more clearly illustrated in FIG. 8. The air is being expelled from the port 6 in the form of a curtain $C_6$ is bent outwards in a curve by the pressure of the air underneath the vehicle and which is contained by the curtains of air from the ports. When the air curtain has been bent outwards to a position substantially vertically beneath the port 6, it flows through the bank of deflector blades. The deflector blades are of suitable aerofoil section, having a convex surface directed away from the space below the vehicle and a concave surface facing the space below the vehicle. The action of the deflector blades is to deflect the curtain of air from the port 6 so that it issues once more with a direction inwards towards the underside of the vehicle. The pressure once again bends the curtain until it is flowing outwards away from the space under the vehicle.

A similar bank of deflector blades 17 can be used at the rear as shown in FIG. 9. The curtain of air $C_7$ being expelled from the port 7 is first directed inwardly being then bent by the pressure beneath the vehicle until it reaches a position substantially vertically beneath the port 7. It then flows through the bank of deflector blades 17, the blades of which may be of the same form as the blades of the deflector bank 16, the convex face facing out from the space beneath the vehicle and the concave face facing the space beneath the vehicle. The action of the rear deflector blades is the same as that of the front ones.

The use of deflector blades enables the curtain to be thinner, and thus the port narrower, than would be the case if deflector blades were not used. Without the deflector blades the curtain would need to be "stiffer" to avoid being bent outwards too quickly by the cushion pressure. This increase in "stiffness" would require an increase in thrust through the port and thus increased power consumption. In order to reduce the drag of the banks of deflector blades, suitably shaped shields 19 are placed in front of and behind the banks.

When the bottoms of the side walls 3 are shaped as shown in FIG. 6, a difficulty arises in sealing the edges of the air curtains expelled from the front and rear ports 6 and 7. The air in the curtains from the ports 6 and 7 flows vertically when viewed from the front or the rear, as shown by the dotted lines $C_7$. This leaves a gap, shown at 21 between the end of the front, and rear, curtain and the side curtain. This gap would allow the air pressure beneath the vehicle to escape and must therefore be prevented. In the case of the side wall shaped as in FIG. 6 this can be done by slanting the end of the port 4, and port 5 in the other side wall, upward as at 22, FIG. 8, until it reaches the vertical inner wall 23 of the side wall. The same curving of the port 4, and port 5, is carried out at the rear end as shown at 24 in FIG. 9.

An alterative cross-sectional shape of the side walls is shown in FIG. 7. In this case the curtain $C_4$ expelled from the port 4a is in contact with the edges of the curtains from the ports 6 and 7 and no difficulty in sealing occurs. However, the pressure within the curtains is acting over a smaller proportion of the total bottom area than in the case where the side walls are formed as in FIG. 6 and the total lifting force is thus decreased.

Figure 10:
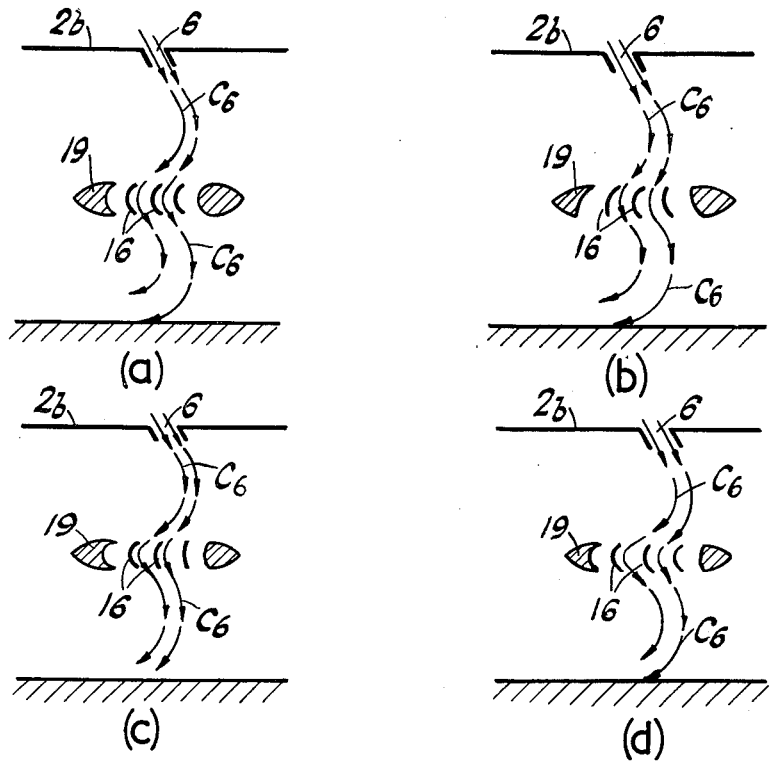
FIG. 10 illustrates various cross-sections of blades suitable for the front deflectors.

The form of the blades comprising the front deflectors may depending upon the requirements. It will be appreciated that in order to enable the vehicle to operate in a stable manner, the cushion pressure must vary with the height of the vehicle. A small decrease or increase of cushion pressure due to increase or decrease in the height of the vehicle will cause the curtain to move inwards or outwards respectively. If, however, the blades of the bank of deflectors all have the same incidence, as in FIG. 10a, then over a certain range of heights, when the curtain is near the outer part of the bank, outward movement of the curtain will cause part of the air to spill over the outer edge of the bank, resulting in a weaker curtain beneath the bank. This tends to cancel out the increase of pressure, and hence the variation of pressure with height which is necessary to achieve stability. By making the blades with differing angles of incidence, to the vertical, as shown in FIG. 10b, the blade with the largest incidence being the outermost one from the cushion, spilling over the outer edge is avoided or reduced and the strength of the curtain is maintained. This results in a sustained variation of cushion pressure height. It will be appreciated that this is not the only factor necessary to achieve stability where local changes of height are experienced, as means must be provided, as described for example in U.S. application Serial No. 16,677, for localising the pressure change due to a local change of height.

FIGURE 10c illustrates blades each of which has a different radius of curvature, the radius being greater for the inside blade than for the outer. By this variation the curtain, which progressively thickens as it travels from the port to the deflectors, can be re-compressed to reduce its thickness and hence increase its stiffness as compared with the case in which all the blades have the same radius of curvature. Moreover with this arrangement the angle of the leading edge each blade can be aligned to the angle of that part of the curtain which impinges upon it. In FIGURE 10d, while the blades are shown with the leading edges varied according to the angle at which the curtain meets the bank of deflector blades, the trailing edges are all parallel so that the air streams through the blades issue in parallel lines. Other forms of blades may be provided to meet other requirements and also blades may be made of a form combining two or more of the individual forms.

Figure 11:
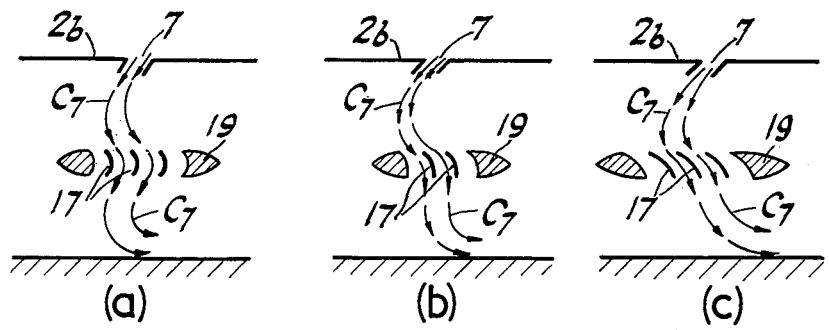
FIG. 11 illustrates various cross-sections of blades suitable for the rear deflectors.

The form of the blades forming the rear deflectors may also be varied. It will be appreciated that if the vehicle is operating over water, with the rear deflector blades shaped as in FIGURE 11a, then if the deflectors should come into contact with the water, for example by hitting a wave, considerable drag and also considerable loads, will be caused by the action of the blades on the water. By reducing the angle through which the blades deflect the curtain, the hydrodynamic loads are reduced. FIGURE 11b shows blades in which there is no velocity component towards the cushion, and FIGURE 11c shows blades with a slight velocity component away from the cushion. This modification of the rear deflector blades will make them less efficient and it may be necessary to have more than one bank of deflector blades. Where two, or more, banks are used they are positioned one above the other being in a staggered formation, the lower bank being displaced slightly rearward relative to the upper bank so as to entrain the curtain.

It will be understood that in each case, each bank of deflectors contains a sufficient number of blades to allow for the fore and aft movement of the curtains with varying cushion pressures.

Figure 12:
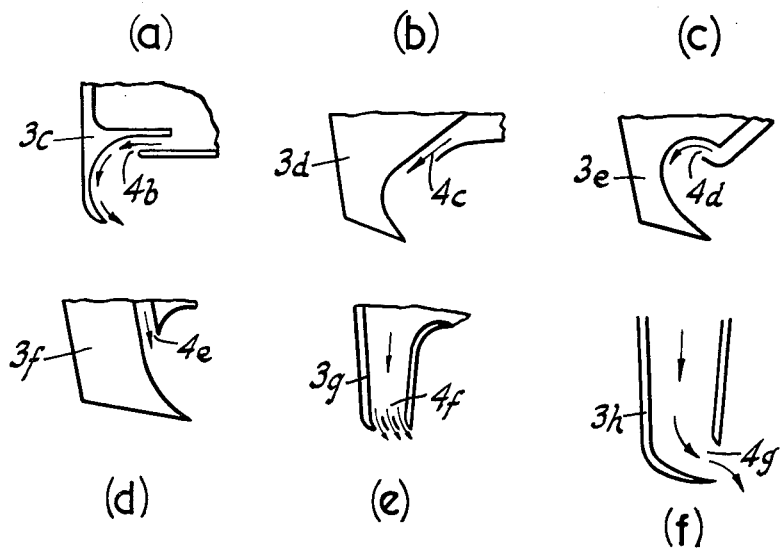
FIG. 12 illustrates further alternate cross-sections of the side wall, with varying forms of mouths or outlets.

Illustrated in FIGURE 12 are further suitable cross-sections for the sidewalls 3. In (a), (b), (c) and (d) the ports 4b, 4c, 4d and 4e for the side curtains are formed at the tops of the inside faces of the walls 3c, 3d, 3e and 3f, respectively, the inside face supporting the curtain until it reaches the bottom edge. This construction enables the actual nozzle forming the port to be placed in a position where it is least likely to be damaged by waves etc., and also in a position where there is less likelihood of water entering the port and interferring with the flow of air along the duct supplying the port. The cross-sections at (e) and (f) in FIGURE 12, wherein the ports 4f and 4g are formed at the bottom edges of side walls 3g and 3h, respectively, have the advantages that they produce the minimum lifting force on the vehicle when running into waves. These alternative cross-sections for the sidewalls are likely to be used when the vehicle is operating so that the bottom of the sidewalls just cut through the crests of the waves. The vehicle may operate at any suitable height varying from, for example, a height where the distance of the bottom of the main body from the water surface is twice the distance of the bottom of the sidewall from the surface, to a height where, as stated above, the walls are just cutting through the crests of the waves. Operating at this latter height would be advisable when the required direction of travel is at an angle to the line of the waves, and also at yet a different angle to any wind direction. Under such conditions, the walls cutting through the wave crests would maintain the vehicle in alignment with its direction of travel. If the vehicle was normally out of contact with the water, it would tend to swing around into the wind and have a sideways component of motion. Should a large wave then make contact with the side walls, there would be a large turning moment on the vehicle.

Figure 5:
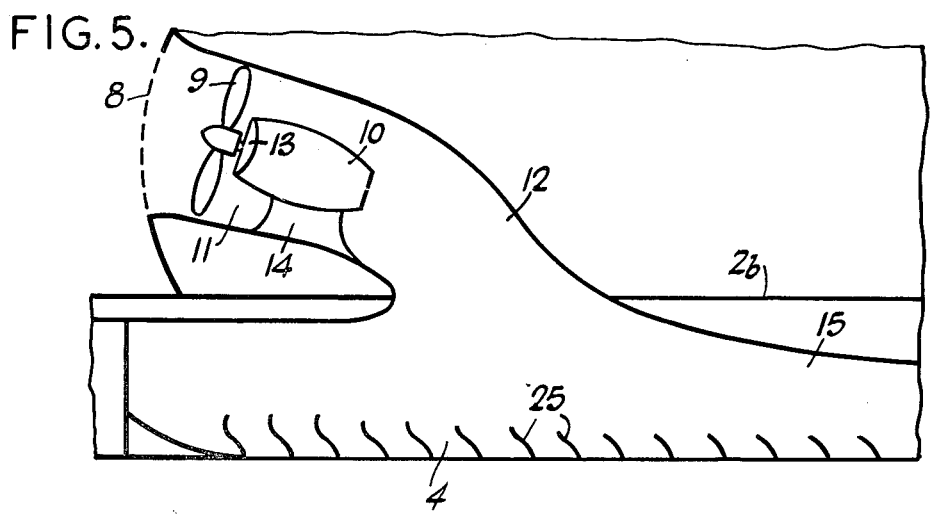
FIG. 5 is a cross section of part of the vehicle on the line B—B of FIG. 4.

The vehicle can be propelled by any suitable means, but in the vehicle described above, propulsion is obtained by providing the side curtains from ports 4 and 5 with a rearward velocity component by means of suitably shaped vanes 25 as shown in FIGURES 5, 8 and 9.

Due to displacement of the water by the air curtain expelled from the side wall, and the wave motion due to the air cushion there is likely to be a slightly greater distance from the water surface to the bottom of the side wall and the bottom of the main body of the vehicle at the rear than at the front. This can be reduced by providing a stronger curtain across the rear than the front and by suitably profiling the longitudinal cross-section of the side wall bottom.

Figure 14:
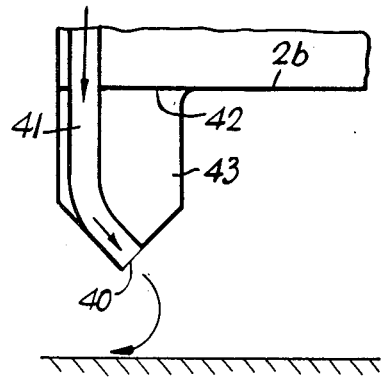
FIG. 14 is a cross-section of an alternative form of side wall which is so constructed as to act as a buoyancy chamber.

It will be obvious that other forms of side wall can be provided depending upon the particular requirements of the operating conditions of the vehicle. For example, single, or multiple, planing steps may be formed on the bottom of the side walls, and on the sides of the side walls, to reduce the area of the surface in contact with the water in a known manner, such as that indicated in U.S. Patents Nos. 1,537,973, 2,423,860 and 2,564,587. Again, as shown in FIG. 14, the side walls 3 can be so constructed that they will form bouyancy chambers (e.g. pontoons) for the vehicle when resting in the water. In the embodiment illustrated, the bottom 2b of the main body of the vehicle is extended across the top of side wall 3 as indicated at 42, and the interior of the side wall is made hollow to form a buoyancy chamber 43, through which passes a duct 41 for supplying curtain forming air to the port 40 formed in the lower part of the side wall.

Figure 15:
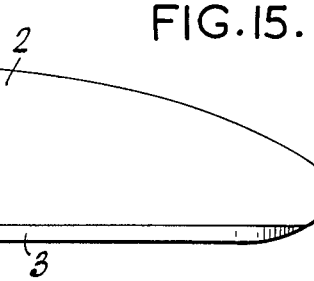
FIG. 15 is a side elevation of a modified form of the vehicle illustrated in FIG. 1 wherein the side walls vary in vertical height along the length thereof.

The side walls 3 may vary in vertical height such that the front and rear ends fair off into the bottom surface of the main body 2, as illustrated in FIG. 15. This variation in height of the side walls may be limited to a relatively short portion at each end, or the height may vary continuously along the length of the side walls, starting at zero at one end, reaching a maximum at some intermediate position and returning to zero at the other end.

Although, in the example described above, only one bank of deflector blades is employed at the front of the vehicle, two, or even more, banks may be employed, suitably positioned to redirect the air curtains.

Figure 16:
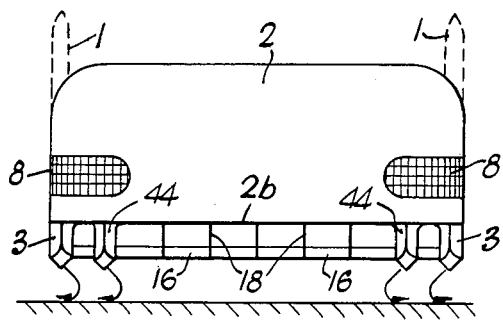
FIG. 16 is a front elevation of a modified form of the vehicle illustrated in FIG. 1 wherein a pair of side walls is provided at each side of the vehicle.
Figure 17:
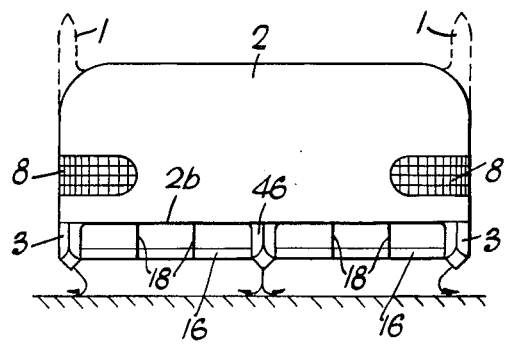
FIG. 17 is a front elevation of still another modification of the vehicle of FIG. 1 which includes a central wall projecting downwardly from the bottom of the vehicle and extending substantially parallel to the side walls.

In an alternative form of the vehicle, shown in FIG. 16, each side wall 3 may be paralleled by a second side wall 44 inboard of and spaced laterally from the latter, so as to form a pair of side walls along each side of the vehicle. In still another modification, shown in FIG. 17, an additional wall 46 may be provided which projects downwardly below the bottom 2b of the vehicle and is located centrally between and extends substantially parallel to the side walls 3. As in the case of walls 44 of FIG. 16, the central wall 46 functions primarily to divide the air cushion beneath the vehicle into compartments for purposes of stability.

Figure 13:
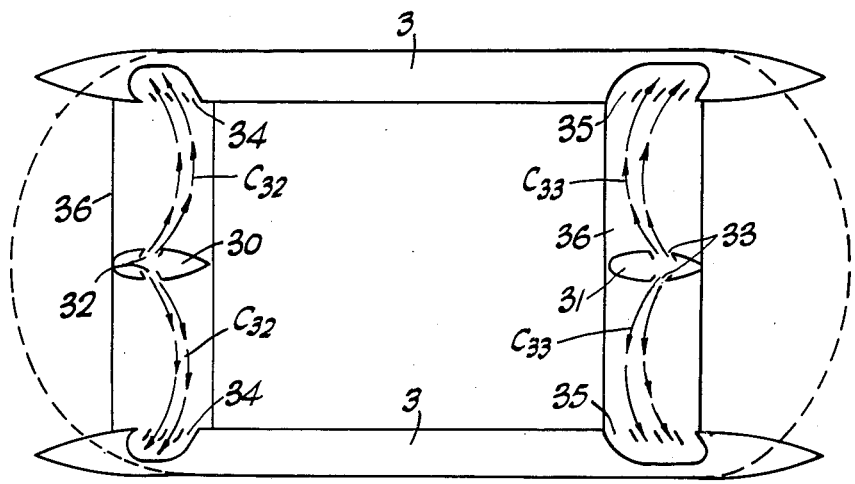
FIG. 13 is a horizontal cross section through the side walls illustrating an alternative construction.

In a further alternative, the vertical curtain between the side walls is replaced by curtains issuing from vertical ports formed either in the sides of the side wall or vertical members placed between the side walls. In FIG. 13, vertical members 30 and 31, of suitable shape are positioned between the side walls 3. Vertical ports 32 and 33 are formed in the sides of the vertical members, one on each side. Air is expelled from these ports to form horizontally directed curtains $C_{32}$ and $C_{33}$ with a velocity component towards the air cushion, the curtains being sent by the cushion pressure, and entering vertical openings 34 and 35 in the side walls. The curtains may alternatively be expelled from vertical ports in the side walls 3, corresponding to vertical openings 34 and 35, and collected in the vertical members 30 and 31 through vertical openings corresponding to ports 32 and 33. In either case the air recovered from the horizontally directed curtains, or a fresh supply of air, is made to issue from horizontal members 36 located beneath the horizontally directed curtains at the front and rear at or near the bottom of the side walls, to form a vertically-directed curtain.

I claim:

1. A vehicle of the type primarily adapted for travelling or hovering over water comprising a main body having front and rear ends, sides and a bottom, and means for forming and peripherally enclosing a pressurized cushion of gas closed at the top by the bottom of said body and at the bottom by the surface of the water therebeneath, the gas of said cushion having a positive pressure sufficient to at least partially support the vehicle at a height above the water which is small in relation to the size of the vehicle, said means including means for forming curtains of fluid at the front and rear ends of the vehicle which issue downwardly and inwardly from the vehicle body and partially enclose said pressurised cushion, and at least one wall located on each side of the vehicle extending substantially parallel to its intended direction of motion and projecting downwardly below the bottom thereof, said walls cooperating with said curtains of fluid to form the remainder of the enclosure of said pressurised cushion.

2. A vehicle of the type primarily adapted for travelling or hovering over water comprising a main body having front and rear ends, sides and a bottom, and means for forming and peripherally enclosing a pressurised cushion of gas closed at the top by the bottom of said body and at the bottom by the surface of the water therebeneath, the gas of said cushion having a positive pressure sufficient to at least partially support the vehicle at a height above the water which is small in relation to the size of the vehicle, said means including means for forming curtains of fluid at the front and rear ends of the vehicle partially enclosing said pressurized cushion, at least one wall located on each side of the vehicle extending substantially parallel to its intended direction of motion and projecting downwardly below the bottom thereof, means for forming curtains of fluid beneath the side walls which cooperate with said walls and with the front and rear fluid curtains to enclose said pressurised cushion, the means for forming the side curtains comprising ports at the lower parts of said side walls and means for causing the curtain-forming fluid to issue from said ports in the form of jets having downward and inward directions relative to the space between said side walls, said side curtains being of less height than said front and rear curtains.

3. A vehicle as claimed in claim 2 including vanes in said ports for imparting a rearward velocity component to said side curtains.

4. A vehicle as claimed in claim 2 wherein the front and rear end portions of said ports at the lower parts of said side walls are so shaped that the front and rear edges of the side curtains issuing from said ports are in contact with the side edges of the front and rear curtains.

5. A vehicle as claimed in claim 2 wherein each of said side walls is provided with a vertical inner wall substantially coplanar with the side edges of the front and rear curtains and the port in said side wall is located at the lower edge of said vertical inner wall.

6. A vehicle as claimed in claim 2 wherein each of said side walls is provided with an inner wall which is concave with respect to the pressurised cushion and the port in said side wall is located above the lower edge of said inner wall.

7. A vehicle of the type primarily adapted for travelling or hovering over water comprising a main body having front and rear ends, sides and a bottom, and means for forming and peripherally enclosing a pressurised cushion of gas between the bottom of said body and the surface of the water therebeneath adapted to at least partially support the vehicle at a height above the water which is small in relation to the size of the vehicle, said means including means for forming curtains of fluid at the front and rear ends of the vehicle partially enclosing said pressurized cushion, at least one wall located on each side of the vehicle extending substantially parallel to its intended direction of motion and projecting downwardly below the bottom thereof, means for forming curtains of fluid beneath said side walls which cooperate with said walls and with the front and rear fluid curtains to enclose said pressurized cushion, the means for forming the side curtains comprising ports at the lower parts of said side walls and means for causing the curtain-forming fluid to issue from said ports in the form of jets having downward and inward directions relative to the space between said side walls, said side curtains being of less height than said front and rear curtains, and a deflector at one end of the vehicle located in the path of the fluid forming the curtain at that end, said deflector being so shaped in cross-section as to deflect the fluid from a component of motion inwards with respect to the pressurised cushion, thereby forming in effect a second curtain which is an extension of that in the path of which the deflector is located.

8. A vehicle as claimed in claim 7 wherein the deflector comprises a bank of deflector blades spaced from each other in a fore-and-aft direction.

9. A vehicle as claimed in claim 8 wherein the angles of incidence to the vertical of the deflector blades in said bank vary from a maximum at the blade outermost from the pressurised cushion to a minimum at the innermost blade.

10. A vehicle as claimed in claim 8 wherein the radii of curvature of the deflector blades in said bank vary from a minimum at the blade outermost from the pressurised cushion to a maximum at the innermost blade.

11. A vehicle as claimed in claim 7 wherein the deflector is substantially horizontal and is located substantially at the same height as the lower parts of the side walls.

12. A vehicle of the type primarily adapted for travelling or hovering over water comprising a main body having front and rear ends, sides and a bottom, and means for forming and peripherally enclosing a pressurised cushion of gas between the bottom of said body and the surface of the water therebeneath adapted to at least partially support the vehicle at a height above the water which is small in relation to the size of the vehicle, said means including means for forming curtains of fluid at the front and rear ends of the vehicle partially enclosing said pressurised cushion, at least one wall located on each side of the vehicle extending substantially parallel to its intended direction of motion and projecting downwardly below the bottom thereof, means for forming curtains of fluid beneath said side walls which cooperate with said walls and with the front and rear fluid curtains to enclose said pressurised cushion, the means for forming the side curtains comprising ports at the lower parts of said side walls and means for causing the curtain-forming fluid to issue from said ports in the form of jets having downward and inward directions relative to the space between said side walls, said side curtains being of less height than said front and rear curtains, and a deflector at each end of the vehicle located in the path of the fluid forming the curtain at that end, each deflector being so shaped in cross-section as to deflect the fluid with a component of motion inwards with respect to the pressurised cushion, thereby forming in effect a second curtain which is an extension of that in the path of which the deflector is located.

13. A vehicle as claimed in claim 12 wherein each deflector comprises a bank of deflector blades spaced from each other in a fore-and-aft direction.

14. A vehicle as claimed in claim 13 wherein the angles of incidence to the vertical of the deflector blades in the bank at the front end of the vehicle vary from a maximum at the blade outermost from the pressurised cushion to a minimum at the innermost blade.

15. A vehicle as claimed in claim 13 wherein the radii of curvature of the deflector blades in the bank at the front end of the vehicle vary from a minimum at the blade outermost from the pressurised cushion to a maximum at the innermost blade.

16. A vehicle as claimed in claim 12 wherein each deflector is substantially horizontal and is located substantially at the same height as the lower parts of the side walls.

17. A vehicle of the type primarily adapted for travelling or hovering over water comprising a main body having front and rear ends, sides and a bottom, and means for forming and peripherally enclosing a pressurised cushion of gas between the bottom of said body and the surface of the water therebeneath adapted to at least partially support the vehicle at a height above the water which is small in relation to the size of the vehicle, said means including means for forming curtains of fluid at the front and rear ends of the vehicle partially enclosing said pressurised cushion, at least one wall located on each side of the vehicle extending substantially parallel to its intended direction of motion and projecting downwardly below the bottom thereof, means for forming curtains of fluid beneath said side walls which cooperate with said walls and with the front and rear fluid curtains to enclose said pressurised cushion, the means for forming the side curtains comprising ports at the lower parts of said side walls and means for causing the curtain-forming fluid to issue from said ports in the form of jets having downward and inward directions relative to the space between said side walls, said side curtains being of less height than said front and rear curtains, and a deflector at the rear end of the vehicle located in the path of the fluid forming the rear curtain, said deflector being so shaped in cross-section as to deflect the fluid with a component of motion rearwards with respect to the pressurised cushion, thereby forming in effect a second curtain which is an extension of the rear curtain.

18. A vehicle of the type primarily adapted for travelling or hovering over water comprising a main body having front and rear ends, sides and a bottom, and means for forming and peripherally enclosing a pressurised cushion of gas between the bottom of said body and the surface of the water therebeneath adapted to at least partially support the vehicle at a height above the water which is small in relation to the size of the vehicle, said means including means for forming curtains of fluid at the front and rear ends of the vehicle partially enclosing said pressurised cushion, at least one wall located on each side of the vehicle extending substantially parallel to its intended direction of motion and projecting downwardly below the bottom thereof, means for forming curtains of fluid beneath said side walls which cooperate with said walls and with the front and rear fluid curtains to enclose said pressurised cushion, the means for forming the side curtains comprising ports at the lower parts of said side walls and means for causing the curtain-forming fluid to issue from said ports in the form of jets having downward and inward directions relative to the space between said side walls, said side curtains being of less height than said front and rear curtains, and a deflector at each end of the vehicle located in the path of the fluid forming the curtain at that end, the deflector at the front end being so shaped in cross-section as to deflect the fluid with a component of motion inwards with respect to the pressurised cushion, thereby forming in effect a second curtain which is an extension of the front curtain, and the deflector at the rear end being so shaped in cross-section as to deflect the fluid with a component of motion rearwards with respect to said cushion, thereby forming in effect a second curtain which is an extension of the rear curtain.

19. A vehicle of the type primarily adapted for travelling or hovering over water comprising a main body having a fore and aft axis extending substantially parallel to the intended direction of motion of the vehicle, means for forming a cushion of pressurised gas beneath the vehicle, said cushion being closed at the top by the body of the vehicle and at the bottom by the surface of the water therebeneath and having a positive pressure sufficient to at least partially support the vehicle at a height above the water which is small in relation to the size of the vehicle, and means for peripherally enclosing said cushion including at least two walls projecting downwardly from the body of the vehicle and extending substantially parallel to the fore and aft axis thereof, each of said walls forming the upper part of a portion of the lateral boundary of said cushion, means for causing fluid to issue downwardly and inwardly from the lower parts of said walls to form curtains of moving fluid between said walls and said surface, each of said curtains forming the lower part of a portion of the lateral boundary of said cushion, and means for forming at least one additional curtain of moving fluid between the body of the vehicle and said surface issuing downwardly and inwardly from said body and extending substantially normal to the fore and aft axis of said vehicle between said walls, said additional curtain forming at least part of the remainder of the lateral boundary of said cushion.

20. A vehicle as claimed in claim 19 wherein each of said side walls is so constructed and arranged as to form a buoyancy chamber for the vehicle when resting in the water.

21. A vehicle as claimed in claim 19 including an additional wall projecting downwardly below the bottom of the vehicle extending substantially parallel to the side walls and located centrally therebetween.

22. A vehicle as claimed in claim 19 wherein a pair of laterally spaced walls are located on each side of the vehicle.

References Cited by the Examiner

UNITED STATES PATENTS

| | | |
|---|---|---|
| 608,757 | 8/98 | Culbertson. |
| 986,766 | 3/11 | Schroeder. |
| 1,819,216 | 8/31 | Warner. |
| 2,218,938 | 10/40 | Rinne. |
| 2,322,790 | 6/43 | Cristadoro. |
| 2,922,277 | 1/60 | Bertin. |

OTHER REFERENCES

Publication: Dep't of the Navy, David Taylor Model Basin, Report 1373, Aero Report 923, July 1957, the two figures on page 22.

Article by J. S. Butz, Jr., entitled "Designers Study Air Cushion Principle for Vehicles," appearing in Aviation Week, January 12, 1959, pages 74 and 75 are pertinent.

Article entitled "Saunders—Roe Studies Ducted Fan Vehicle" appearing in April 27, 1959 issue of Aviation Week, pages 32 and 33 are pertinent.

The History of Air Cushion Vehicles by L. H. Hayward, printed in November 1962.

A. HARRY LEVY, *Primary Examiner.*

ARTHUR M. HORTON, WILLIAM J. KANOF,
*Examiners.*